(12) United States Patent
Bolton et al.

(10) Patent No.: US 8,909,803 B2
(45) Date of Patent: *Dec. 9, 2014

(54) ACCESSORY IDENTIFICATION FOR MOBILE COMPUTING DEVICES

(75) Inventors: Lawrence G. Bolton, Fremont, CA (US); Shyam S. Toprani, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 938 days.

This patent is subject to a terminal disclaimer.

(21) Appl. No.: 12/405,077

(22) Filed: Mar. 16, 2009

(65) Prior Publication Data

US 2010/0231352 A1    Sep. 16, 2010

(51) Int. Cl.
G06F 15/173 (2006.01)
G06F 13/38 (2006.01)

(52) U.S. Cl.
CPC .................... *G06F 13/387* (2013.01)
USPC .................. 709/230; 709/227; 710/303

(58) Field of Classification Search
USPC ............... 709/230, 227; 455/557; 710/105
See application file for complete search history.

(56) References Cited

U.S. PATENT DOCUMENTS

| | | |
|---|---|---|
| 4,850,899 A | 7/1989 | Maynard |
| 4,916,334 A | 4/1990 | Minagawa et al. |
| 4,924,216 A | 5/1990 | Leung |
| 4,938,483 A | 7/1990 | Yavetz |
| 5,247,138 A | 9/1993 | Landmeier |
| 5,475,836 A | 12/1995 | Harris et al. |
| 5,525,981 A | 6/1996 | Abernethy |
| 5,618,045 A | 4/1997 | Kagan et al. |
| 5,732,361 A | 3/1998 | Liu |
| 5,835,862 A | 11/1998 | Nykanen et al. |
| 5,859,522 A | 1/1999 | Theobald |
| 5,964,847 A | 10/1999 | Booth, III et al. |
| 6,012,105 A | 1/2000 | Rubbmark et al. |
| 6,078,402 A | 6/2000 | Fischer et al. |
| 6,078,789 A | 6/2000 | Bodenmann et al. |
| 6,154,798 A | 11/2000 | Lin et al. |
| 6,161,027 A | 12/2000 | Poirel |

(Continued)

FOREIGN PATENT DOCUMENTS

| | | |
|---|---|---|
| CN | 1764217 A | 4/2006 |
| EP | 1104150 A2 | 5/2001 |

(Continued)

OTHER PUBLICATIONS

Specification "Universal Serial Bus (USB) Specification" (chap 6-8) (publication date: Apr. 27, 2000) to USB authors. ("USB").*

(Continued)

*Primary Examiner* — Phuoc Nguyen
*Assistant Examiner* — June Sison
(74) *Attorney, Agent, or Firm* — Kilpatrick Townsend & Stockton LLP

(57) ABSTRACT

Embodiments disclosed herein provide for identification processes and/or procedures for accessories coupled with a mobile computing device. During identification an accessory can communicate lingo information that includes only those lingoes the accessory can use while coupled with the mobile computing device. The accessory can also communicate accessory protocol information to the mobile computing device during identification. The accessory can be limited to using only those lingoes and/or those protocols identified during identification. Various other accessory information, capabilities, preferences, etc. can also be communicated to the mobile computing device during identification.

27 Claims, 9 Drawing Sheets

(56) References Cited

U.S. PATENT DOCUMENTS

| | | |
|---|---|---|
| 6,188,265 B1 | 2/2001 | Liu et al. |
| 6,397,261 B1 | 5/2002 | Eldridge et al. |
| 6,421,716 B1 | 7/2002 | Eldridge et al. |
| 6,453,371 B1 | 9/2002 | Hampson et al. |
| 6,463,473 B1 | 10/2002 | Gubbi |
| 6,487,189 B1 | 11/2002 | Eldridge et al. |
| 6,493,760 B1 | 12/2002 | Pendlebury et al. |
| 6,526,287 B1 | 2/2003 | Lee |
| 6,601,102 B2 | 7/2003 | Eldridge et al. |
| 6,608,399 B2 | 8/2003 | McConnell et al. |
| 6,665,803 B2 | 12/2003 | Lunsford et al. |
| 6,724,339 B2 | 4/2004 | Conway et al. |
| 6,725,061 B1 | 4/2004 | Hutchison, IV et al. |
| 6,859,538 B1 | 2/2005 | Voltz |
| 6,928,295 B2 | 8/2005 | Olson et al. |
| 6,931,266 B2 | 8/2005 | Miyoshi et al. |
| 7,050,783 B2 | 5/2006 | Curtiss et al. |
| 7,062,261 B2 | 6/2006 | Goldstein et al. |
| 7,127,678 B2 | 10/2006 | Bhesania et al. |
| 7,167,935 B2 | 1/2007 | Hellberg |
| 7,187,947 B1 | 3/2007 | White et al. |
| 7,187,948 B2 | 3/2007 | Alden |
| 7,215,042 B2 | 5/2007 | Yan |
| 7,254,708 B2 | 8/2007 | Silvester |
| 7,284,059 B2 | 10/2007 | Isozu |
| 7,293,122 B1 * | 11/2007 | Schubert et al. ................ 710/62 |
| 7,299,304 B2 | 11/2007 | Saint-Hilaire et al. |
| 7,305,254 B2 | 12/2007 | Findikli |
| 7,305,506 B1 | 12/2007 | Lydon et al. |
| 7,363,045 B2 | 4/2008 | Rogalski et al. |
| 7,441,062 B2 | 10/2008 | Novotney et al. |
| 7,529,870 B1 | 5/2009 | Schubert et al. |
| 7,667,715 B2 | 2/2010 | MacInnis et al. |
| 2001/0005641 A1 | 6/2001 | Matsumoto et al. |
| 2001/0006884 A1 | 7/2001 | Matsumoto |
| 2002/0002035 A1 | 1/2002 | Sim et al. |
| 2002/0029303 A1 | 3/2002 | Nguyen |
| 2002/0065074 A1 | 5/2002 | Cohn et al. |
| 2002/0068610 A1 | 6/2002 | Anvekar et al. |
| 2002/0072390 A1 | 6/2002 | Uchiyama |
| 2002/0095570 A1 | 7/2002 | Eldridge et al. |
| 2002/0103008 A1 | 8/2002 | Rahn et al. |
| 2002/0105861 A1 | 8/2002 | Leapman |
| 2002/0115480 A1 | 8/2002 | Huang |
| 2002/0132651 A1 | 9/2002 | Jinnouchi |
| 2002/0151327 A1 | 10/2002 | Levitt |
| 2002/0152874 A1 | 10/2002 | Vilcauskas et al. |
| 2002/0156546 A1 | 10/2002 | Ramaswamy |
| 2002/0156949 A1 | 10/2002 | Kubo et al. |
| 2002/0173273 A1 | 11/2002 | Spurgat et al. |
| 2002/0174269 A1 | 11/2002 | Spurgat et al. |
| 2002/0194621 A1 | 12/2002 | Tran et al. |
| 2003/0004934 A1 | 1/2003 | Qian |
| 2003/0041206 A1 | 2/2003 | Dickie |
| 2003/0059022 A1 | 3/2003 | Nebiker et al. |
| 2003/0073432 A1 | 4/2003 | Meade |
| 2003/0079038 A1 | 4/2003 | Robbin et al. |
| 2003/0090988 A1 | 5/2003 | Chen et al. |
| 2003/0185395 A1 | 10/2003 | Lee et al. |
| 2003/0208750 A1 | 11/2003 | Tapper et al. |
| 2003/0220988 A1 | 11/2003 | Hymel |
| 2004/0048569 A1 | 3/2004 | Kawamura |
| 2004/0103223 A1 | 5/2004 | Gabehart et al. |
| 2004/0116005 A1 | 6/2004 | Choi |
| 2004/0162029 A1 | 8/2004 | Grady |
| 2004/0164708 A1 | 8/2004 | Veselic et al. |
| 2004/0186935 A1 | 9/2004 | Bel et al. |
| 2004/0194154 A1 | 9/2004 | Meadors et al. |
| 2004/0224638 A1 | 11/2004 | Fadell et al. |
| 2004/0249994 A1 | 12/2004 | Shapiro et al. |
| 2004/0267812 A1 | 12/2004 | Harris et al. |
| 2005/0014531 A1 | 1/2005 | Findikli |
| 2005/0022212 A1 | 1/2005 | Bowen |
| 2005/0097087 A1 | 5/2005 | Punaganti Venkata et al. |
| 2005/0135790 A1 | 6/2005 | Hutten |
| 2005/0149213 A1 | 7/2005 | Guzak et al. |
| 2005/0181756 A1 | 8/2005 | Lin |
| 2005/0207726 A1 | 9/2005 | Chen |
| 2006/0088228 A1 | 4/2006 | Marriott et al. |
| 2006/0101146 A1 | 5/2006 | Wang |
| 2006/0156415 A1 | 7/2006 | Rubinstein et al. |
| 2006/0161621 A1 | 7/2006 | Rosenberg |
| 2006/0184456 A1 | 8/2006 | de Janasz |
| 2006/0247851 A1 | 11/2006 | Morris |
| 2006/0258289 A1 | 11/2006 | Dua |
| 2007/0056013 A1 | 3/2007 | Duncan |
| 2007/0080823 A1 | 4/2007 | Fu et al. |
| 2007/0086724 A1 | 4/2007 | Grady et al. |
| 2007/0173294 A1 | 7/2007 | Hsiung |
| 2007/0226384 A1 | 9/2007 | Robbin et al. |
| 2007/0236482 A1 | 10/2007 | Protor et al. |
| 2007/0271387 A1 * | 11/2007 | Lydon et al. ................ 709/230 |
| 2007/0300155 A1 * | 12/2007 | Laefer et al. ................ 715/700 |
| 2008/0080703 A1 | 4/2008 | Penning et al. |
| 2008/0188209 A1 * | 8/2008 | Dorogusker et al. ...... 455/414.2 |
| 2008/0256205 A1 | 10/2008 | Mahoney |
| 2008/0291905 A1 | 11/2008 | Chakravadhanula et al. |
| 2009/0055510 A1 | 2/2009 | Svendsen |
| 2009/0138948 A1 | 5/2009 | Calamera et al. |
| 2009/0231415 A1 | 9/2009 | Moore et al. |
| 2010/0046732 A1 | 2/2010 | James et al. |
| 2010/0234068 A1 | 9/2010 | Bolton et al. |
| 2010/0235550 A1 | 9/2010 | Bolton et al. |
| 2011/0164533 A1 | 7/2011 | Krumel |

FOREIGN PATENT DOCUMENTS

| | | |
|---|---|---|
| EP | 1498899 A1 | 1/2005 |
| EP | 1594319 A1 | 11/2005 |
| EP | 1672613 A2 | 6/2006 |
| JP | 2000-214953 A | 8/2000 |
| WO | 02/01804 A1 | 1/2002 |
| WO | WO 03-036541 A1 | 5/2003 |
| WO | WO 03-073688 A1 | 9/2003 |
| WO | WO 2004-084413 A2 | 9/2004 |
| WO | WO 2005-119463 A2 | 12/2005 |
| WO | WO 2010/107576 A1 | 9/2010 |
| WO | WO 2010/107580 A1 | 9/2010 |

OTHER PUBLICATIONS

Non-Final Office Action of May 12, 2011 for U.S. Appl. No. 12/479,555, 30 pages.

Non-Final Office Action of Jan. 20, 2011 for U.S. Appl. No. 12/479,555, 26 pages.

International Application No. PCT/US2010/025954, International Search Report and Written Opinion, 8 pages, Jun. 4, 2010.

International Application No. PCT/US2010/025927, International Search Report and Written Opinion, 7 pages, Jun. 4, 2010.

Bluetooth®, "Specification of the Bluetooth System—Architecture & Terminology Overview," Version 2.1 + EDR, 111 pages, Jul. 26, 2007.

"Universal Serial Bus Specification," Revision 2.0, 147 pages, Apr. 27, 2000.

Menezes et al., "Handbook of Applied Cryptography," Identification and Entity Authentication, pp. 385-424.

Sinitsyn, "A Synchronization Framework for Personal Mobile Servers," Pervasive Computing and Communications Workshops (PERCOMW'04), Proceedings of the Second IEEE Annual Conference, Piscataway, NJ, USA, IEEE, Mar. 14, 2004, pp. 208-212.

"The Authoritative Dictionary of IEEE Standards Terms, Seventh Edition," Published by Standards Information Network, IEEE Press, 2000, 3 pages.

Vitaliano, "Why FireWire is Hot!Hot!Hot!" downloaded Oct. 16, 2001, "Impact.FireWire.SideBar" http:--www.vxm.com-21R.35.html.

Whittle, "Public Key Authentication Framework: Tutorial," First Principles Consulting, Jun. 2, 1996, downloaded Oct. 6, 2004, http:--www.ozemail.com.au-~firstpr-crypto-pkaftute.htm, 7 pages.

International Application No. PCT/US2005/045040, International Search Report, 13 pages, May 15, 2006.

(56) References Cited

OTHER PUBLICATIONS

U.S. Appl. No. 11/051,499, Office Action, 32 pages, Sep. 16, 2008.
U.S. Appl. No. 11/051,499, Amendment, 15 pages, Dec. 2, 2008.
U.S. Appl. No. 11/051,499, Supplemental Amendment, 4 pages, Dec. 5, 2008.
U.S. Appl. No. 11/051,499, Final Office Action, 25 pages, Mar. 19, 2009.
U.S. Appl. No. 11/051,499, Amendment With RCE, 13 pages, Jun. 19, 2009.
International Preliminary Report on Patentability for International Application No. PCT/US2010/025954, mailed on Sep. 29, 2011, 6 pages.
International Preliminary Report on Patentability for International Application No. PCT/US2010/025927, mailed on Sep. 29, 2011, 5 pages.
Final Office Action of Oct. 17, 2011 for U.S. Appl. No. 12/479,555, 27 pages.
Non-Final Office Action for U.S. Appl. No. 12/411,287, mailed on Apr. 10, 2012, 36 pages.
Non-Final Office Action for U.S. Appl. No. 12/479,555, mailed on Jul. 30, 2012, 32 pages.
Non-Final Office Action for U.S. Appl. No. 12/411,287, mailed on Aug. 10, 2012, 23 pages.
Chinese Office Action mailed on Dec. 4, 2013 for CN Patent Application No. 201080021429.9, with English Translation, 10 pages.
Chinese Office Action mailed on Dec. 4, 2013 for CN Patent Application No. 201080021427.X, with English Translation, 17 pages.
Bluetooth®, "Specification of the Bluetooth System—Architecture & Terminology Overview," Version 1.2 [vol. 3], 36 pages, Dec. 31, 2007.
First Office Action for European Patent Application No. 10 707 755.4, mailed on Aug. 30, 2012, 4 pages.
First Office Action for European Patent Application No. 10 707 754.7, mailed on Aug. 30, 2012, 5 pages.

* cited by examiner

| Token | Value |
|---|---|
| Lingo | Bitmask identifying command groups (lingoes) used |
| Accessory Capabilities | Byte string(s) identifying MCD capabilities usable by the accessory |
| Accessory Preferences | Byte string(s) identifying MCD preferences associated with the capabilities |
| Accessory Info | Alphanumeric string accessory mfr, model, serial #, version info, etc |
| Protocol | Alphanumeric string indicating supported accessory-specific protocols |
| Preferred Application | Alphanumeric string indicating a preferred application |

*FIG. 5*

ACCESSORY IDENTIFICATION FOR MOBILE COMPUTING DEVICES

BACKGROUND

The present disclosure relates generally to communication between an accessory and a mobile computing device and in particular to identification routines, schemes and/or processes between an accessory and a mobile computing device.

Mobile computing devices (MCDs) have become ubiquitous. Various companies have created MCDs, such as the iPhone™, iPod Touch™, various Blackberry® devices, and smart phones compatible with Google's Android™ platform, to name a few. MCDs often include web browsers, word processors, email applications, maps, telephone services, games, audio applications, video applications, etc. Moreover, accessories have also been created for use with MCDs. Such accessories can communicate with an MCD using one or more connectors and/or ports. Such accessories can be used to control features of the MCD or used by the MCD to interact with users and/or the environment. Often the accessories and the MCD use a communication protocol provided by the developers of the MCD for interaction between the two.

BRIEF SUMMARY

According to various embodiments, identification and/or initialization schemes and processes are provided between an accessory device and an MCD. The accessory device, for example, can request lingo version information and/or MCD capability information from the MCD. If the MCD returns the lingo version information and/or capability information, this information can be used by the accessory to determine the lingoes the accessory can use during communication with the MCD, and the accessory can identify such lingoes to the MCD. In particular, in some embodiments, subsequent communication between the accessory and the MCD can be limited to only those lingoes identified to the MCD by the accessory. In some embodiments, the accessory might not re-identify itself or request the use of new or different lingoes after initialization and/or identification. The accessory can also communicate accessory capability information, accessory preference information, accessory information, accessory protocol information, preferred application information, etc. during initialization and/or identification. In some embodiments, the accessory can also communicate with the MCD using accessory protocols identified by the accessory during initialization and/or identification. Various modifications, sequencing, enhancements are also be provided.

BRIEF DESCRIPTION OF THE DRAWINGS

FIG. 5 shows an example of tokens that can be used by an accessory to provide the commands shown in FIG. 4 in communication with an MCD during identification according to some embodiments.

DETAILED DESCRIPTION

Embodiments disclosed herein are directed toward identification processes between an accessory and an MCD. In some embodiments, the accessory can identify the lingos and/or protocols the accessory can use while coupled with the MCD. Subsequent communication between the two devices can be restricted to only the lingoes and/or protocols identified by the accessory.

In some embodiments, an accessory can request lingo version information and/or capability information from the MCD. The accessory can then determine the lingoes and/or protocols the accessory can use during communication while coupled with the MCD based at least in part on the lingo version(s) supported by the MCD and/or the capabilities of the MCD.

In some embodiments, an accessory can also send various message that can indicate accessory information, accessory capabilities, accessory preferences, accessory protocol information, preferred application information, etc. Moreover, transaction IDs can be included with the tokens, messages, commands, and/or data sent between the accessory and the MCD.

The term "token" as used throughout this disclosure refers to a code-value pair. In particular, the code can be a bit string that identifies information type and the value can contain the actual information. The code, for example, can be a 2-byte code that identifies the token and the related value. The value can have a fixed or variable length. In some embodiments, a variable length token can include an identification of the length of the token. An accessory and/or an MCD can parse the value based on the associated code. A token can be communicated to and/or from an accessory to an MCD in one or more packets. Thus, a single packet can include the code and all of the value, or two or more packets can include the value with the first packet including the code and/or an identification of the length.

Figure 1:
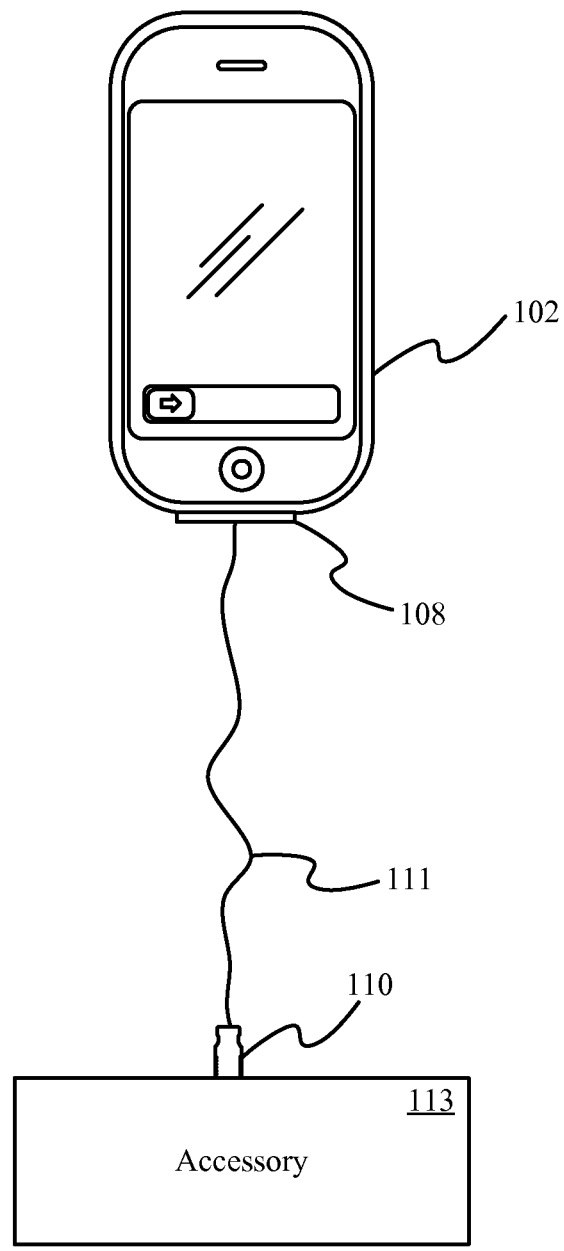
FIG. 1 shows a block diagram of an accessory coupled with an MCD according to one embodiment.
Figure 2:
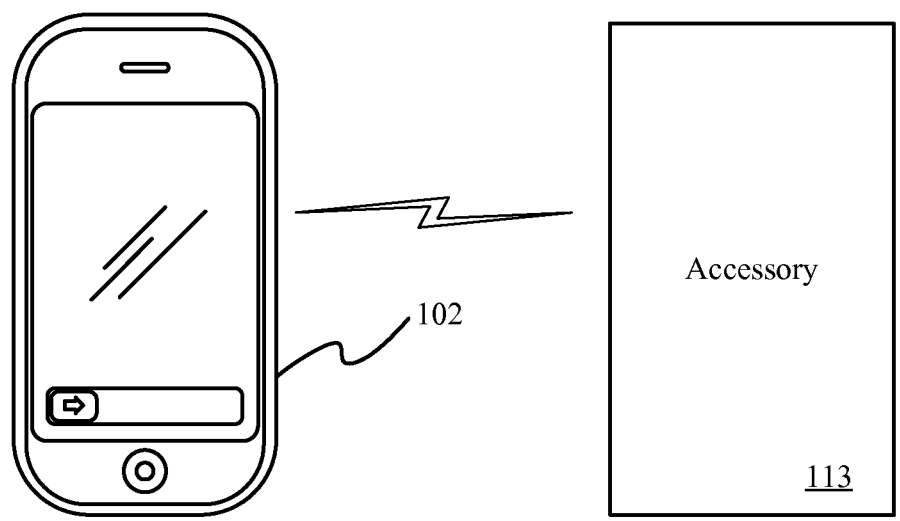
FIG. 2 shows a block diagram of an accessory wirelessly communicating with an MCD according to one embodiment.

FIG. 1 shows an MCD 102 coupled with an accessory device 113. Cable 111 is used to couple MCD 102 with accessory device 113. Cable 111 can include connector 108 to connect with MCD 102 and connector 110 to connect with accessory device 113. FIG. 2 shows accessory device 113 wirelessly coupled with MCD 102.

MCD 102 can be any type of mobile computing/communication device; for example, an iPod Touch™, iPhone™, Android compatible device, and/or a Blackberry device can also be used. Furthermore, any of various media players can also be used, for example, an iPod®, a Zune, a Sada, or other media player. Moreover, MCD 102 can provide media player capability, networking, web browsing, email, word processing, data storage, application execution, and/or any other computing or communication functions. Accessory 113 can be an external speaker dock; multimedia device; consumer electronic device; test instrument; home appliance (e.g., refrigerator or dishwasher); speaker(s); exercise equipment; security system; home or office automation system; camera; keyboard; measurement device; external video device; medical device (e.g., glucose monitor or insulin monitor); point of sale device; automobile; automobile accessory (e.g., car stereo system or car navigation system); radio (e.g., FM, AM and/or satellite); entertainment console on an airplane, bus, train, or other mass transportation vehicle; etc. Any type of device that can be used in conjunction with an MCD can be used as an accessory device.

Figure 3:
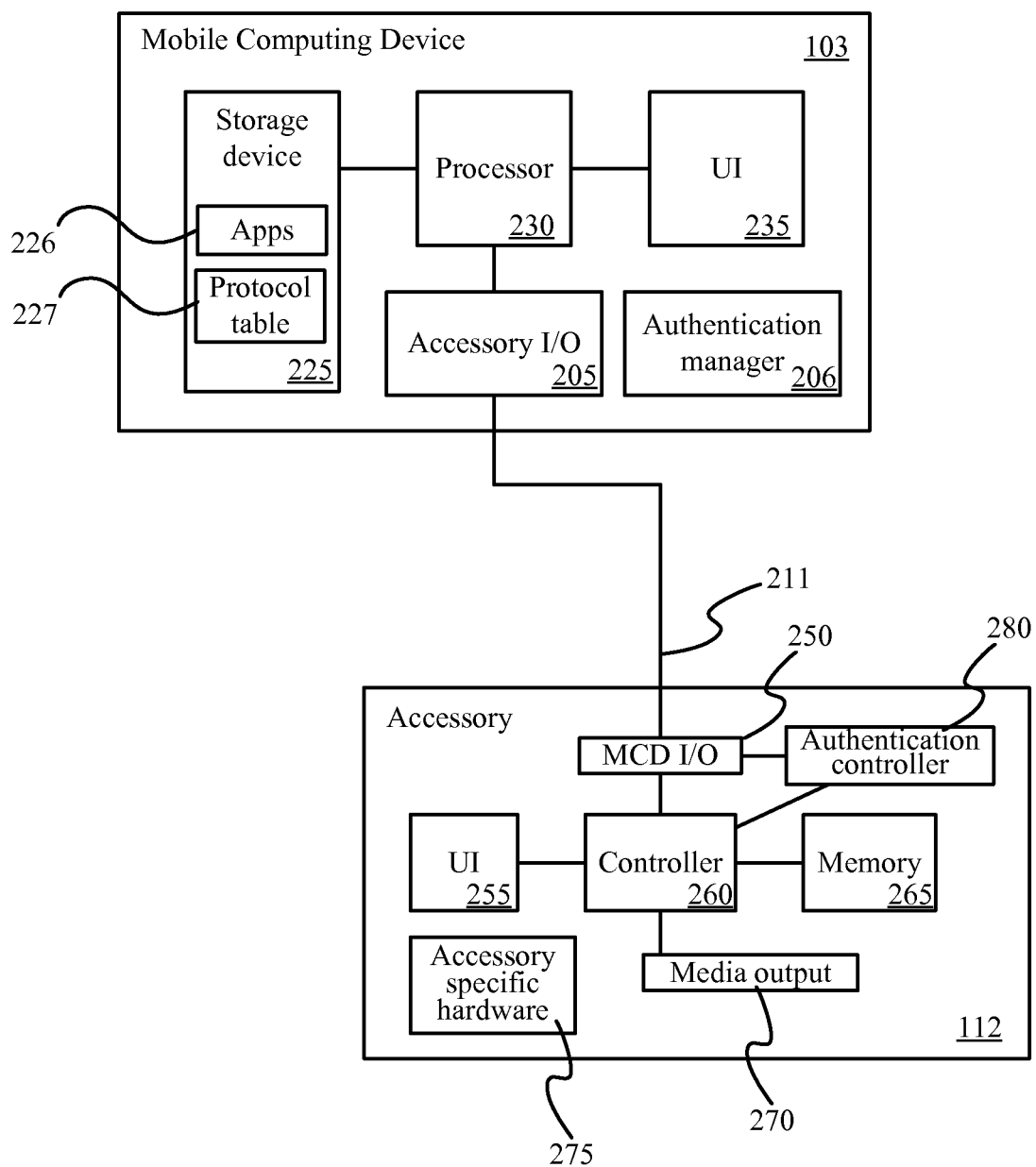
FIG. 3 shows a block diagram of a mobile computing device (MCD) and an accessory device coupled together according to one embodiment.

FIG. 3 shows a block diagram of MCD 103 coupled with accessory 112 according to some embodiments. MCD 103 can include processor 230, storage device 225, user interface (UI) 235, and accessory input/output (I/O) interface 205. Processor 230, in some embodiments, can execute various software programs or applications (Apps) 226 stored in storage device 225. Processor 230 can interact with accessory 112 through I/O interface 205 and/or with a user through user interface 235. In some embodiments, processor 230 can execute an application stored in storage device 225 that requires input/output from either or both of user interface 235 and/or accessory 112. Storage device 225 can include other information including digital media, documents, tables, working memory, applications, various lookup tables, etc. For example, storage device 225 can include a protocol table 227 that specifies protocols that applications can use to communicate with an accessory device. Storage device 225 can be implemented, for example, using disk, flash memory, or any other non-volatile storage medium.

User interface 235 can include input controls, such as a touch pad, touch screen, scroll wheel, click wheel, dial, button, keypad, microphone, or the like, as well as output devices, such as video screen, indicator lights, speakers, headphone jacks or the like, together with supporting electronics (e.g., digital-to-analog or analog-to-digital converters, signal processors, video processors, etc). A user can operate the various input controls of user interface 235 to invoke the functionality of MCD 103 and can view and/or hear output from MCD 103 via user interface 235.

Signals can be communicated between MCD 103 and accessory 112 using connection 211 that can include any wired and/or wireless communications protocol or set of protocols. Wired connections can be connector-to-connector or using intervening cables (e.g. as shown in FIG. 1). Any number of communication paths can be used. They can be separate paths or various subsets can be multiplexed onto a common path. Different embodiments can have fewer or more signal paths. In some embodiments, the set of communication paths can be provided by a multi-pin connector. In some embodiments, some signals can have dedicated pins and others can share one or more pins. In other embodiments, connection 211 can be implemented using a wireless s protocol such as Bluetooth or WiFi.

Connection 211 can be part of a larger I/O interface, which can include components for communicating with elements other than accessory 112, such as one or more host computers or one or more networks. The I/O interface can include, for example, one or more peripheral interfaces, such as USB, IEEE 1394 (Firewire), and Bluetooth (a short-range wireless communication standard developed by the Bluetooth SIG and licensed under the trademark Bluetooth®). The I/O interface can also or alternatively include one or more wired networking interfaces (e.g., Ethernet) or wireless networking interfaces (e.g., Wi-Fi adhering to one of the 802.11 family standards, digital mobile phone technologies). In some embodiments (possibly the same as those above, but possibly different embodiments) the I/O interface can have the ability to couple MCD 103 with a source of data, such as media assets, applications, data, commands, functions, etc., (e.g., via a wireless connection to the Internet) so that the MCD can obtain such data without connecting to a host computer.

Accessory I/O interface 205 can allow MCD 103 to communicate with various accessories. Accessory I/O interface 205 includes at least one communication port. MCD 103 can also include an authentication manager 206, which can communicate with authentication controller 280 of the accessory to authenticate and provide privileges (or permissions) to an accessory. Authentication manager 206 can perform cryptography functions in conjunction with the authentication controller. In some embodiments, such cryptography functions include public-private key cryptography.

Accessory I/O interface 205 can support connections to various accessories, such as an external speaker dock; multimedia device; consumer electronic device; test instrument; home appliance (e.g., refrigerator or dishwasher); speaker(s); exercise equipment; security system; home or office automation system; camera; keyboard; measurement device; external video device; medical device (e.g., glucose monitor or insulin monitor); point of sale device; automobile; automobile accessories (e.g., car stereo system or car navigation system); radio (e.g., FM, AM and/or satellite); entertainment console on an airplane, bus, train, or other mass transportation vehicle; etc. In one embodiment, accessory I/O interface 205 includes a 30-pin connector corresponding to the connector used on iPod® products manufactured and sold by Apple Inc. Alternatively or additionally, accessory I/O interface 205 can include a wireless interface, such as, for example, Bluetooth, wireless personal area network, or WiFi interfaces. It is to be understood that interface 205 can be any interface, whether wired or wireless, or a combination thereof, that enables communication of signals therethrough.

In some embodiments, MCD 103 can also use accessory I/O interface 205 to communicate with a host computer (not explicitly shown) that executes an asset management program (for example, iTunes® or the Microsoft application and/or music store) that can provide access to media and/or applications. The asset management program can enable a user to add media assets and/or applications to MCD 103 and/or remove media assets and/or applications from MCD 103. The user can update metadata associated with media assets and applications on MCD 103. In some embodiments, the user can also interact with the asset management program to create and update playlists and/or applications as well as other documents. In one embodiment, the host computer maintains a master database of media assets and/or applications and can access other databases through the Internet (including associated metadata and playlists). The asset management program can synchronize the master database with the database maintained on storage device 225 of MCD 103 automatically whenever MCD 103 connects to the host computer.

Accessory 112 can include controller 260, user interface 255, MCD I/O interface 250, memory 265, and media output device 270. Accessories can include accessory specific hardware 275. Accessory specific hardware 275 can include, for example, probes, motors, actuators, receivers for broadcast signals, user interfaces, sensors, interfaces, glucose monitors, interfaces with electronic devices, sensors, detectors, or any other device. Controller 260 can include, e.g., a microprocessor or microcontroller executing program code to perform various functions, such as digital audio decoding, analog or digital audio and/or video processing, controlling operation of any included test probes, meters, receivers, actuators, motors, user interfaces, and the like. User interface 255 can include input controls, such as a touch pad, touch screen, scroll wheel, click wheel, dial, button, keypad, microphone, probes, etc., as well as output devices, such as a video screen, indicator lights, speakers, headphone jacks or the like, together with supporting electronics (e.g., digital-to-analog or analog-to-digital converters, signal processors or the like). Alternatively, output components of user interface 255 can be integrated with media output device 270. A user can operate the various input controls of user interface 255 to invoke the functionality of accessory 112 and can view and/or hear output from accessory 112 via user interface 255. In addition, in some embodiments, a user can operate MCD 103 via user interface 255.

MCD accessory I/O interface 205 can allow accessory 112 to communicate with MCD 103 (or another MCD). In some embodiments, MCD accessory I/O interface 250 is configured to connect to a specific port of MCD 103, whether wired or wireless.

Memory 265 can be implemented using any type of memory that can store program code for controller 260 and/or store data. Memory 265 can include volatile and/or nonvolatile memory that can provide storage for various information, for example, including information obtained from MCD 103. For example, in some embodiments, accessory 112 can obtain user input, data, metadata and/or status information from MCD 103. Any or all of this information can be stored in memory 265. Caching of information obtained from MCD 103 by accessory 112 is optional; where used, caching can help speed up performance of accessory 112 by avoiding repeated requests for information from MCD 103.

Media output device 270, which can be implemented, e.g., as one or more integrated circuits, provides the capability to output various types of media. For example, media output device 270 can include a display screen or a driver circuit and connector for an external display screen, thereby enabling video and/or still images to be presented to a user. Additionally or instead, media output device 270 can also include one or more speakers or driver circuits and connectors for external speakers, thereby enabling audio to be presented to a user. In one embodiment, controller 260 can receive media content signals from MCD 103 via an MCD I/O interface 250 and can provide the signals with or without further processing to media output device 270; media output device 270 can transform the signals as appropriate for presentation to the user.

Accessory 112 can be any accessory capable of being used with a mobile computing device. Examples of accessories implementing blocks shown in accessory 112 include, e.g., an external speaker dock; multimedia device; consumer electronic device; test instrument; home appliance (e.g., refrigerator or dishwasher); speaker(s); exercise equipment; security system; home or office automation system; camera; keyboard; measurement device; external video device; medical device (e.g., glucose monitor or insulin monitor); point of sale device; automobile; automobile accessories (e.g., car stereo system or car navigation system); radio (e.g., FM, AM and/or satellite); entertainment console on an airplane, bus, train, or other mass transportation vehicle; etc. In one embodiment, MCD accessory I/O interface 250 includes a 30-pin connector that mates with the connector used on iPod® or iPhone™ products manufactured and sold by Apple Inc. MCD accessory I/O interface 250 can also include other types of connectors, e.g., Universal Serial Bus (USB) or FireWire connectors. Alternatively or additionally, MCD I/O interface 250 can include a wireless interface, such as Bluetooth, personal wireless area network, and/or WiFi. It is to be understood that interface 205 can be any interface, whether wired or wireless, or a combination thereof, that enables communication of signals therethrough.

Accessory I/O interface 205 of MCD 103 and MCD I/O interface 250 of accessory 112 allow MCD 103 to be connected to accessory 112 and subsequently disconnected from accessory 112. As used herein, MCD 103 and accessory 112 are "connected" whenever a communication channel between accessory I/O interface 205 and MCD I/O interface 250 is open and are "disconnected" whenever the communication channel is closed. Connection can be achieved by physical attachment (e.g., between respective mating connectors of MCD 103 and accessory 112), by an indirect attachment such as a cable, or by establishing a wireless communication channel. Similarly, disconnection can be achieved by physical detachment, disconnecting a cable, powering down accessory 112 or MCD 103, or closing the wireless communication channel. Thus, a variety of communication channels can be used, including wired channels such as USB, FireWire, or universal asynchronous receiver/transmitter ("UART"), or wireless channels such as Bluetooth, WiFi, infrared, or the like. In some embodiments, multiple communication channels between an MCD and an accessory can be open concurrently, or an MCD can be connected to multiple accessories, with each accessory using a different communication channel.

Regardless of the particular communication channel, as long as MCD 103 and accessory 112 are connected to each other, the devices can communicate by exchanging commands and data according to a protocol. The protocol defines a format for sending messages between MCD 103 and accessory 112. For instance, the protocol can specify that each message is sent in a packet with a header and an optional payload. The header can provide basic information such as a start indicator, length of the packet, and a command to be processed by the recipient, while the payload provides any data associated with the command; the amount of associated data can be different for different commands, and some commands can provide for variable-length payloads. The packet can also include error-detection or error-correction codes as known in the art. In various embodiments, the protocol can define commands to indicate an action to be taken by the recipient, commands to signal completion of a task, commands to change the state of the MCD or accessory, commands to initiate the occurrence of an error, and/or commands to identify the nature of the associated data. In some embodiments, the commands can be defined such that any particular command is valid in only one direction.

The protocol can define a number of "lingoes," where a "lingo" refers generally to a group of related commands that can be supported (or unsupported) by various classes of accessories. In one embodiment, a command can be uniquely identified by a first byte identifying the lingo to which the command belongs and a second byte identifying the particular command within the lingo. Other command structures can also be used. It is not required that all accessories, or all MCDs to which an accessory can be connected, support every lingo defined within the protocol or every command of a particular lingo (for instance, different devices might use different versions of a given lingo).

In some embodiments, every accessory and every MCD can be designed to interoperate with each other to support at least a "general" lingo that includes commands common to all such devices. The general lingo can include commands enabling the MCD and the accessory to identify themselves to each other and to provide at least some information about their respective capabilities, including which (if any) other lingoes each supports and which capabilities of the other device each intends to use while connected. Examples of such commands are described below.

The general lingo can also include authentication commands that the MCD can use to verify the purported identity and capabilities of the accessory (or vice versa), and the accessory (or MCD) can be blocked from invoking certain commands or lingoes if the authentication is unsuccessful.

According to some embodiments, accessory 112 can include authentication controller 280 that is used to authenticate accessory 112 with MCD 103 and receive privileges and/or permissions therefrom. In other embodiments, accessory 112 might not include an authentication controller, in which case, accessory 112 would not be able to authenticate itself and receive privileges from MCD 103.

It will be appreciated that the system configurations and components described herein are illustrative and that variations and modifications are possible. The MCD and/or accessory can have other capabilities not specifically described herein.

While accessory 112 and MCD 103 are described in FIG. 3 with reference to particular blocks, it is understood that the blocks are defined for convenience of description and are not intended to imply a particular physical arrangement of component parts. Further, the blocks need not correspond to physically distinct components.

Figure 4:
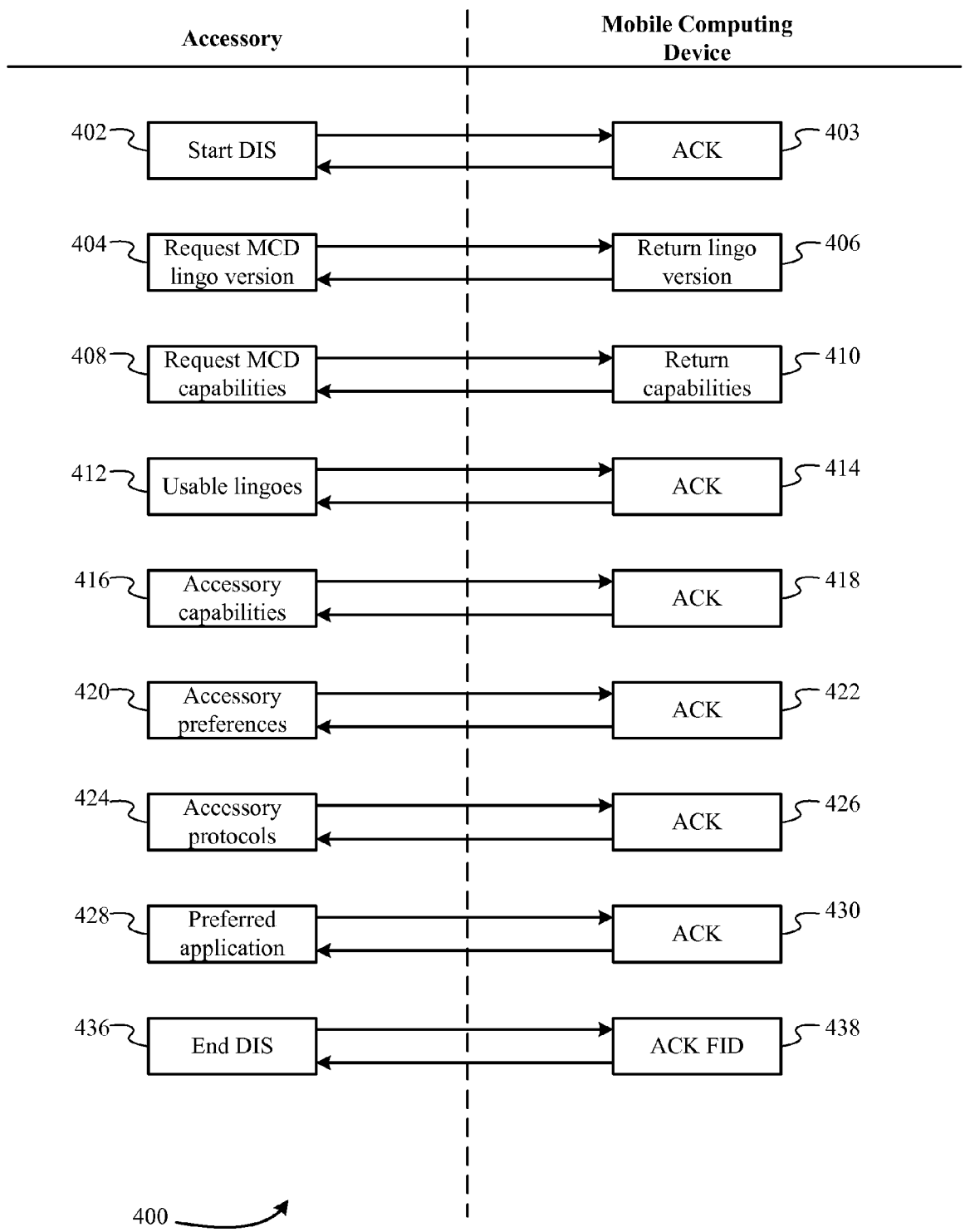
FIG. 4 is a diagram showing commands that can be sent to and from an accessory coupled with an MCD during an identification scheme according to some embodiments.

FIG. 4 is a chart 400 showing an example of identification messages and/or acknowledgements that can be passed between an accessory and a portable computing device during identification routines. In some embodiments, some or all of these messages and/or acknowledgements can be passed using tokens or commands. In some embodiments, the routine can be referred to as a device identification sequence (DIS). As shown, a DIS can begin with a Start DIS command 402 being sent from the accessory to the MCD. Start DIS command 402 indicates the beginning of the DIS. The command puts the MCD on alert to expect messages consistent with DIS until an End DIS command is received. In some embodiments, an acknowledgement from the MCD is not required for Start DIS 402; however, an acknowledgement can be sent by the MCD to the accessory, for example, indicating that the MCD is ready for the next command as shown at block 403.

In some embodiments, during DIS the accessory can send request 404 to the MCD requesting a response that indicates the lingo version (or versions) supported by the MCD. The MCD can then return a message 406 indicating the lingo version (or versions) supported by the MCD. The accessory can also send request 408 to the MCD requesting the capabilities of the MCD, whereupon the MCD can respond with return message 410 indicating the capabilities of the MCD. In some embodiments, return message 410 can include a bitmask where the state of each bit can indicate whether a specific capability is supported or not supported. These capabilities can include, for example, whether the MCD supports analog line-in, analog line-out, analog video-in, analog video-out, digital audio out, digital audio in, digital video in, digital video out, speakerphone, communication with MCD operating system application, etc.

Usable lingoes message 412, which can be sent to the MCD from the accessory, can include an identification of a set of usable lingoes that the accessory can use during communication with the MCD. In some embodiments, the lingoes message can include a bitmask where the state of each bit can indicate whether a specific lingo is supported or not supported. The set of usable lingoes can be determined based in part on the received capabilities of the MCD and/or the supported lingo versions of the MCD. This identification of a set of usable lingoes can be sent, for example, using a lingo token that can include an indication of the lingoes as the token's value. In response, the MCD can send an optional acknowledgment message 414. In some embodiments, the accessory's subsequent (i.e., post DIS) communication with the MCD can be limited to only those lingoes that were identified by the lingo token, and this limitation can persist until the accessory is disconnected from the MCD or until the MCD and/or the accessory are rebooted. Thus, if the accessory sends a command using a lingo that was not included in the set of usable lingoes, the MCD can ignore the command or return an error message. Thus, the accessory pushes the set of usable lingoes to the MCD without previously having the MCD request these lingoes. Moreover, the set of usable lingoes is established at the outset of a communication session rather than incrementally. In some embodiments, the usable lingo information (and other DIS information disclosed herein) is sent to the MCD prior to authentication processes between the MCD and the accessory.

The lingoes in the set of usable lingoes can be chosen based at least in part on the lingo version (or versions) supported by the MCD. For example, if the MCD does not support a particular lingo, it can be omitted from the set of usable lingoes. Furthermore, the set of usable lingoes can depend on the capabilities of the MCD. For example, if the MCD does not support video input, lingoes associated with video input can be omitted from the set of usable lingoes. Various other lingoes associated with other capabilities can be included or excluded from the usable lingoes list depending on the capabilities of the MCD.

In some embodiments, accessory capabilities message 416 can also be sent indicating the usable capabilities of the MCD supported by the accessory. In some embodiments, accessory capabilities can be sent using an accessory capabilities token. In some embodiments, accessory capabilities can be sent as a bitmask where the state of each bit can indicate whether a capability is supported. For example, capabilities can include whether the accessory supports analog line-in to the MCD, analog line-out from the MCD, analog video-in to the MCD, analog video-out from the MCD, digital audio out from the MCD, digital audio in to the MCD, digital video in to the MCD, digital video out, speakerphone, communication with MCD operating system application, etc. Acknowledgement message 418 can optionally be sent from the MCD indicating that the accessory capabilities message 416 was received. In some embodiments, if the accessory indicates that an capability is not supported, then the MCD can turn off the capability.

In some embodiments, accessory preferences message 420 can also be sent indicating the accessory's initial preference for the MCD capabilities supported by the MCD and/or the accessory. Accessory preferences, in some embodiments, can be sent using an accessory preferences token. In some embodiments, accessory preferences can be sent as a bitmask where the state of each bit can indicate whether a capability is supported. Accessory preferences message 420 can include a bit mask with each bit indicating an initial state of a predefined preference for an MCD capability. For instance, capabilities can have two or more states, and these preferences can indicate the initial state of one or more capability. For example, if the accessory capabilities 416 indicated that the accessory supports video input to the MCD, then accessory preferences 420 can indicate whether video input to the MCD is originally in the "ON" state or the "OFF" state. The state of a capability can be changed during operation regardless of the state indicated in accessory preferences 420. In some embodiments, the accessory preferences message can set the desired initial state (for example, "ON" or "OFF") of the MCD capabilities such as analog line-in to the MCD, analog line-out from the MCD, analog video-in to the MCD, analog video-out from the MCD, digital audio out from the MCD, digital audio in to the MCD, digital video in to the MCD, digital video out, speakerphone, communication with MCD operating system application, etc. Some capabilities can have more than two states; in such embodiments the state can be indicated accordingly. Acknowledgment message 422 can optionally be sent from the MCD to the accessory indicating the accessory preferences message 420 was received.

In some embodiments, accessory protocol message 424 can also be sent indicating one or more accessory protocols that the accessory can use to communicate with the MCD and/or an application executing at the MCD. For example, a developer and/or manufacturer of an accessory can provide an application that can be used to interoperate with the accessory. The application can require exchange of information in formats not available using the lingoes and/or protocols of the MCD. To allow such information exchange between the accessory and the application, an accessory-specific protocol can be used. Accessory protocol 424 can be used to indicate whether one or more accessory-specific protocols are supported. Acknowledgment message 426 can optionally be sent to acknowledge receipt of the accessory protocol message 424.

In some embodiments, accessory protocol message 424 can indicate an accessory-specific protocol using a reverse domain name convention. Conventional domain names provide, from left to right, lower level domains to top level domains. For example, in the domain name: "help.example.com", the term "com" is the top level domain and the term "example" is a lower level domain, and the term "help" is the lowest level domain. As another example, the domain name "mac.apple.com" from left to right specifies the lowest level domain "mac", the middle domain "apple", and the top level domain "com". Reverse domain names on the other hand would provide "com.apple.mac".

The reverse domain name convention can be used to specify accessory protocols used by a specific company associated with the domain name. That is, the reverse domain name "com.company1.accessory1" specifies that the "accessory1" protocol is associated with the company "company1". Thus, in general, a company that manufactures and/or sells accessories can implement a protocol using the reverse domain name convention, where the first portion of the reverse domain name references the company ("com.company1") and can be associated with the company's Internet domain name. The second portion of the reverse domain name ("accessory1") specifies a specific protocol. Because most companies are associated with a domain name, a reverse domain name convention allows companies to distinguish applications and/or protocols and/or accessories from those of other companies by naming their protocols with their reverse domain name. This convention, allows companies to independently name their protocols without concern for the naming convention of other companies. Moreover, if there is a conflict between two companies using the same naming convention, a simple check of the domain name should determine which company has rights to the naming convention.

In some embodiments, preferred application message 428 can also be sent to the MCD indicating a preferred application for use with the accessory. A preferred application identifier can be used to indicate an application that uses one of the supported accessory protocols and that can be downloaded and/or executed on the MCD. Thus, when an accessory couples with an MCD that does not include an application that has the capability to communicate with the accessory, preferred application identifier can point the MCD to a web page or other network location (such as the iTunes® store) from which a preferred application can be downloaded. Acknowledgment message 430 can optionally be sent from the MCD to the accessory indicating the preferred application message 428 was received.

FIG. 4 shows a number of optional acknowledgement messages that can be sent from the MCD to the accessory. These acknowledgements can be sent after a complete request, message and/or token is received or they can be sent after each packet that comprises the request, message and/or token is received. As will be discussed later, these acknowledgements can also include a transaction ID. In some embodiments, an acknowledgement is sent only when an error occurs. Accordingly, in such embodiments, it can be assumed that the command, request, and/or message was received without an error if no acknowledgement is sent.

FIG. 5 shows an example of a table 500 showing some of the various tokens (code-value pairs) that an accessory can communicate to an MCD during identification in some embodiments. This information can include an identify token whose value can include a bitmask that identifies which of the lingoes as specified by the MCD protocol are usable by the accessory. An accessory capabilities token can include a string that specifies various MCD capabilities that are usable by the accessory. These capabilities can include, e.g., whether the accessory supports analog line-in to the MCD, analog line-out from the MCD, analog video-in to the MCD, analog video-out from the MCD, digital audio out from the MCD, digital audio in to the MCD, digital video in to the MCD, digital video out, speakerphone, communication with MCD operating system application, etc.

An accessory preferences token can include various preferences for the initial state of the capabilities specified in the accessory capabilities token. For example, the accessory preferences token can indicate whether the analog line-in to the MCD should initially be "ON" or "OFF" state, whether the analog line-out from the MCD should initially be "ON" or "OFF" state, whether the analog video-in to the MCD should initially be "ON" or "OFF" state, whether the analog video-out from the MCD should initially be "ON" or "OFF" state, whether the digital audio out from the MCD should initially be "ON" or "OFF" state, whether the digital audio in to the MCD should initially be "ON" or "OFF" state, whether the digital video in to the MCD should initially be "ON" or "OFF" state, whether the digital video out should initially be "ON" or "OFF" state, and/or whether the speakerphone should initially be "ON" or "OFF" state. In some embodiments, preferences can include whether the microphone should operate at full duplex, at half duplex, with noise cancellation, without noise cancellation, with stereo input and/or with mono input. In some embodiments, the preferences can also indicate the preferences for video out put such as refresh rate, picture size, format, sound quality, volume, etc. In some embodiments, preference can be sent for location data such as whether the location data is sent synchronously, asynchronously, when there are changes, a change threshold, etc.

An accessory information token can provide accessory information items, such as accessory name, accessory firmware version, accessory hardware version, accessory manufacturer, accessory model number, accessory serial number, etc. In some embodiments, other accessory information items can be included and/or some of those shown can be excluded.

The accessory can also send one or more protocol tokens. Each protocol token can include a protocol index and/or a protocol string. Any number of protocol tokens can be sent. The protocol index can be a unique integer that is assigned by the accessory and that can be associated with a specific protocol string. The protocol string can be a string, for example, in reverse domain name format, specifying an accessory protocol that can be used for communication between the accessory and the MCD. A preferred application token can include an identifier (e.g., URL) for locating a preferred application associated with one of the accessory protocols specified in the protocol token. Preferred application information can be used to specify an application that uses one of the above specified protocol strings and that can be downloaded and/or executed on the MCD. Thus, when an accessory couples with an MCD that does not include an application that has the capability to communicate with the accessory, preferred application information can point the MCD to a web page or other network location (such as the iTunes® store) from which a preferred application can be downloaded.

Figure 6:
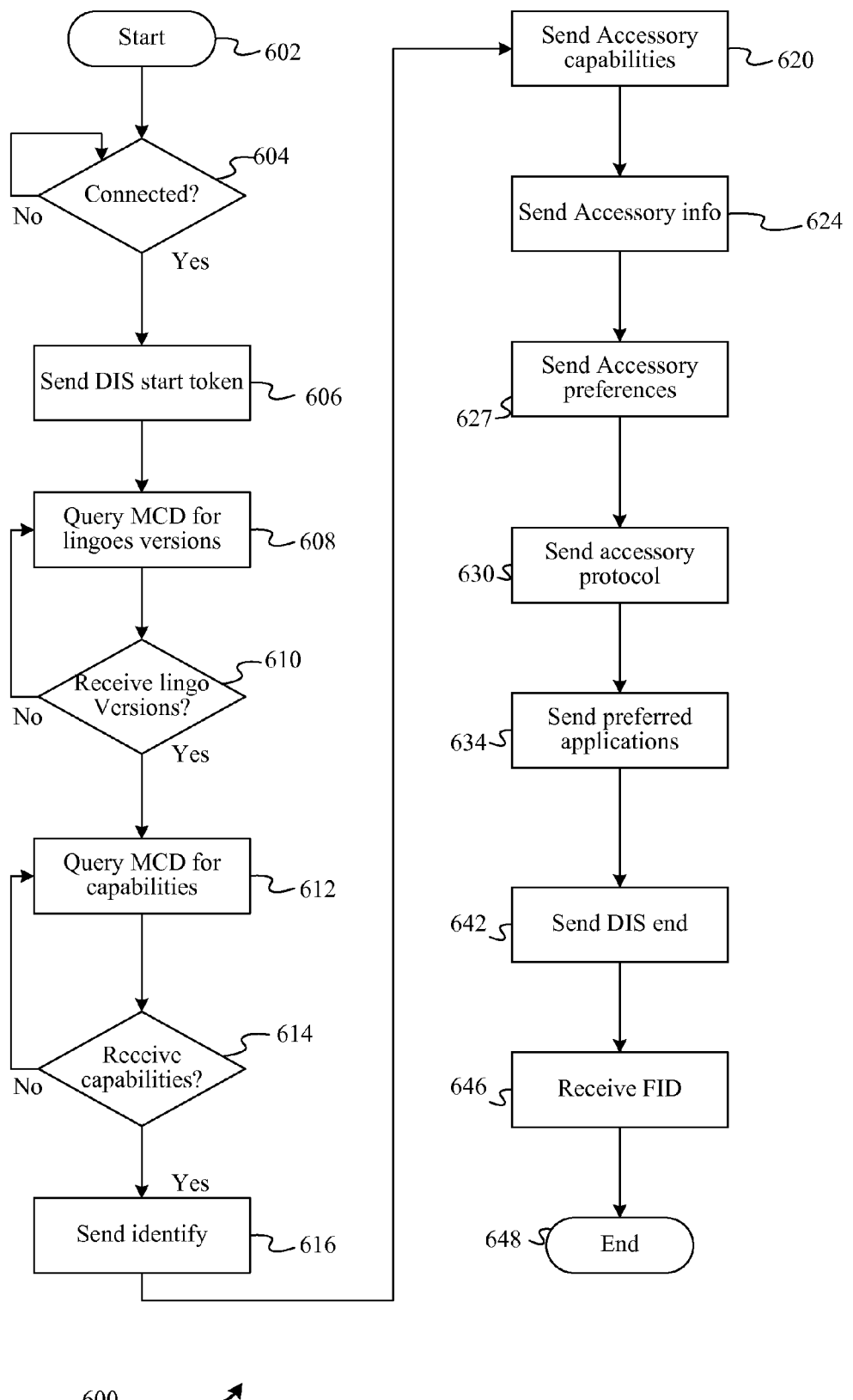
FIG. 6 shows a flowchart of an identification scheme according to some embodiments.

FIG. 6 shows a flowchart of an identification process 600 according to some embodiments. Any block, step and/or function shown in FIG. 6 can be excluded or placed in a different order. For example, any of the sending and/or receiving of acknowledgements can be included or excluded as described above.

The process starts at block 602 where it is determined whether an accessory is coupled with an MCD at block 604. If so, a DIS start command can be sent at block 606. The DIS start command puts the MCD on alert that data consistent with identification follows. In some embodiments, the MCD can send an acknowledgement that the DIS start command has been received.

The accessory can query the MCD for lingo version (or versions) information at block 608 that indicates the version (or versions) of various lingoes that are supported by the MCD. A command can be sent to the MCD requesting the supported lingo version (or versions) information. In some embodiments, the accessory can wait until the MCD sends a message indicating the version (or versions) of lingoes supported by the MCD. If the accessory does not receive lingo version information at block 610, then the accessory can return to block 608 and again request lingo version information. In some embodiments, an accessory can wait a set period of time before requesting lingo version information again.

When lingo version or version information is received at block 610, the accessory can request capability information from the MCD at block 612 that indicates the capabilities of the MCD. A command can be sent to the MCD requesting the capabilities of the MCD. In some embodiments, the accessory can wait until the MCD sends a message indicating the capabilities supported by the MCD. If the accessory does not receive capabilities information at block 614, then the accessory can return to block 612 and again request capabilities information. In some embodiments, the accessory can wait a set period of time before returning to block 612.

When MCD capabilities information is received at block 614, the accessory can send an identify message at block 616. In some embodiments, the identify message can correspond to and/or include the identify token shown in FIG. 5 and/or the usable lingoes message described in conjunction with block 412 in FIG. 4. The identify message, for example, can include an indication of one or more of the lingoes actually supported by the accessory. In some instances, the accessory can identify every lingo it supports, but in other cases, an accessory might identify fewer than all supported lingoes. In some embodiments, the lingoes identified in the identify command are the only lingoes the accessory will be allowed to use while communicating with the MCD. If the accessory does not include an indication of a lingo in the identify command, the MCD can reject any commands of that lingo the accessory subsequently sends. In some embodiments, the accessory can determine the list of lingoes that it might use to communicate with the MCD based in part on the lingo version information received from the MCD and/or the capabilities of the MCD. For example, the accessory can exclude lingoes for which desired features are not present in the lingo version identified by the MCD. Moreover, the accessory can also exclude lingoes that require MCD capabilities that were not identified by the MCD. Thus, in some embodiments, the set of usable lingoes can depend on the lingo version information received from the MCD and/or on the MCD capabilities information received from the MCD.

An accessory capabilities message can be sent at block 620. In some embodiments, the accessory capabilities message can correspond to and/or include the accessory capabilities token shown in FIG. 5 and/or the accessory capabilities message described in conjunction with block 416 of FIG. 4. The accessory capabilities message can indicate the capabilities of the accessory, for example, whether the accessory is capable of supporting analog line-in to the MCD, analog line-out from the MCD, analog video-in to the MCD, analog video-out from the MCD, digital audio out from the MCD, digital audio in to the MCD, digital video in to the MCD, digital video out, speakerphone, communication with MCD operating system application, etc.

An accessory information message can be sent at block 624. In some embodiments, the accessory information message can correspond to the accessory information token in FIG. 5. The accessory information message can specify accessory information such as, for example, accessory name, accessory firmware version, accessory hardware version, accessory manufacturer, accessory model number, and/or accessory serial number.

An accessory preferences message can be sent at block 627. In some embodiments, the accessory information message can correspond to accessory information token in FIG. 5 and/or the accessory preferences described in conjunction with block 420 of FIG. 4. The accessory preferences message can indicate the preferences of the capabilities sent at block 620. For example, the preferences can indicate whether any or all of the capabilities are to initially be in the "ON" or "OFF" state. In some embodiments, the capabilities can have more than one state, and the preferences can indicate the desired initial state accordingly.

An accessory protocol message can be sent at block 630. In some embodiments, the accessory protocol message can correspond to and/or include the accessory protocol token shown in FIG. 5 and/or the accessory protocols described in relation to block 424 of FIG. 4. The accessory protocol message can provide an indication of an accessory protocol or protocols that can be supported by the accessory. The accessory protocol message, for example, can indicate accessory protocols using a reverse domain name convention and can also provide an accessory protocol identifier that is uniquely related to each indicated accessory protocol.

A preferred application message can be sent at block 634. In some embodiments, the preferred application message can correspond with the preferred application token in FIG. 5 and/or the preferred application identifier discussed in relation to block 428 of FIG. 4. The preferred application message can indentify an application, such as a preferred application, that can be used at the MCD in conjunction with the accessory. Moreover, the preferred application message can also indicate a URL, link, address, etc. where the preferred application can be downloaded. Thus, if the MCD does not include an application that supports the protocols identified in the accessory protocol message or that does not support the accessory, then the application identified in the preferred application identifier can be downloaded and executed.

An end identify message can be sent at block 642. The end identify message can be used to signal the end of the identification sequence. An acknowledgement can optionally be received after the end identify message.

In some embodiments, after the end identify message has been received at the MCD at block 646 the MCD can send a full identification message to the accessory. The full identification message can confirm receipt of each of the messages and/or tokens received during the identification process and/or can provide an indication that each of the received messages and/or tokens received. In some embodiments, the full identification message can confirm that each of the messages, commands and/or tokens received from the accessory were successfully parsed and/or executed at the MCD.

In some embodiments, after the identification sequence shown in FIG. 6 has been completed the accessory can authenticate itself with the MCD using any authentication scheme. Thereafter the accessory and the MCD can communicate using any of the lingoes identified in block 616. In addition if accessory identifies an accessory protocol at block 630, the accessory and MCD can use the protocols so identified.

In some embodiments, when an accessory sends a message, the accessory can wait until an acknowledgement message is received. For example, an acknowledgement can follow some or all the packets that make up a message. In some embodiments, the accessory can time-out if an acknowledgement message is not received within a set time frame. In other embodiments if an acknowledgement message is not received, the process can return back to the previous step in the process. In yet other embodiments, the process can wait a specified period of time for an acknowledgement before moving on to the next block. In some embodiments, the MCD can send an negative acknowledgement only when there is an error in the message. In some embodiments, the accessory can In some embodiments, the identify message sent at block 616 and/or the accessory capabilities message sent at block 620 must be sent in the order shown in FIG. 6. That is, in some embodiments, the identify message sent at block 616 and/or the accessory capabilities message sent at block 620 must be sent after the capabilities message is received from the MCD at block 614. Moreover, in some embodiments, the accessory info message, the accessory preferences message, the accessory protocol message, and/or the preferred applications message (see blocks 624, 627, 630, 634) can be sent in any order and/or omitted. In other embodiments, the messages described in conjunction with the blocks depicted in FIG. 6 can be sent in any order.

Figure 7:
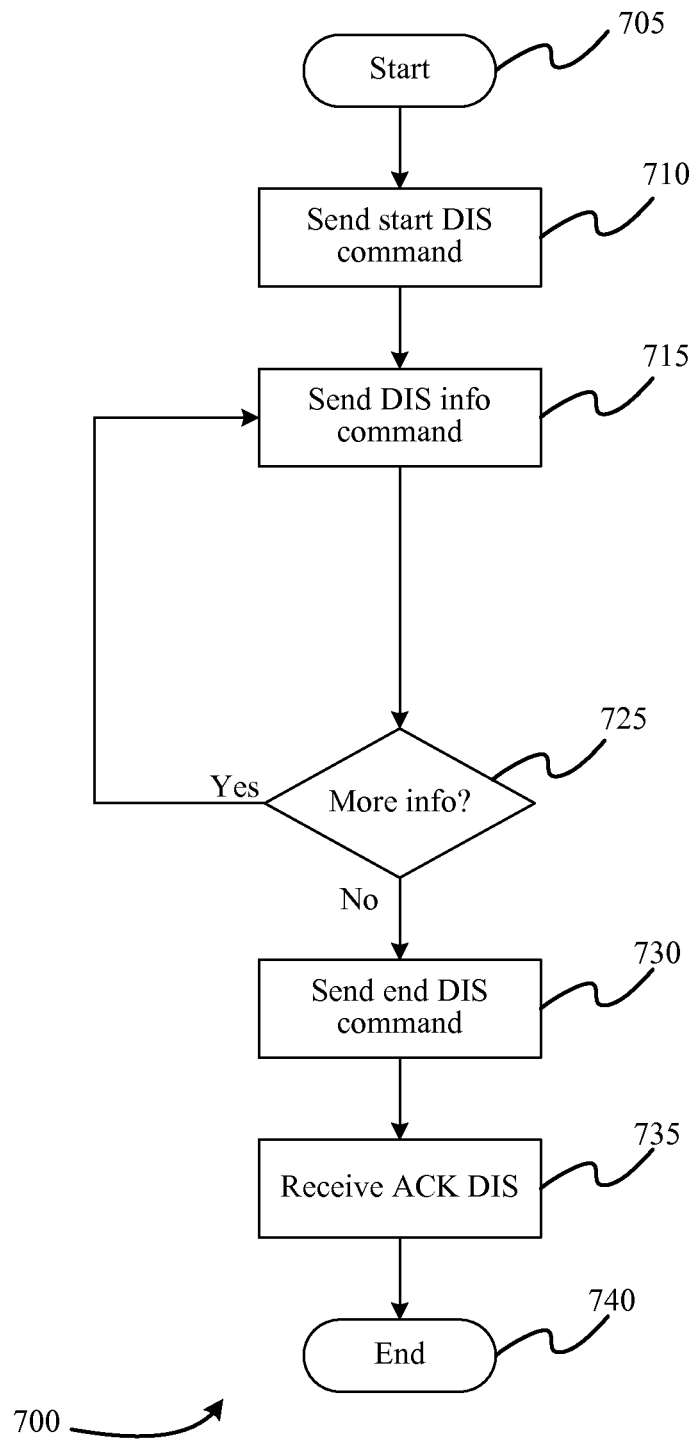
FIG. 7 shows a flowchart of an identification scheme at an accessory according to some embodiments.

FIG. 7 shows another flowchart of an identification process 700 according to some embodiments. Identification of the accessory begins at block 805. A start DIS command can be sent at block 810 indicating the beginning of identification. Identification information can be sent at block 815 using a send DIS information command. Identification information can include accessory name, accessory model number, accessory serial number, accessory type, accessory supported lingoes, accessory capabilities, accessory preferences, accessory protocols, preferred application identifier, accessory microphone capabilities, etc. Moreover, some identification information can be sent singularly as shown in FIG. 6 and/or FIG. 5. Various tokens, messages, and/or commands can be used to send identification information. For example, the tokens shown in FIG. 5 can be used to send identification information.

At block 815 the accessory can send a DIS information command to provide some or all of its identification information to the MCD. Identification information sent at block 815 can include, e.g., accessory name, accessory model number, accessory serial number, accessory type, accessory supported lingoes, accessory capabilities, accessory preferences, accessory protocols, preferred application identifier, accessory microphone capabilities, etc. For example, in one embodiment, the identification information can be structured into tokens as shown in FIG. 5 and/or can be represented as a sequence of bytes. If the protocol for communication between the accessory and the MCD specifies that information is to be communicated as command packets (e.g., as described above), the identification information can be sent using one or more packets. Each packet can include a command code. In each packet the command code can be the same command code corresponding to a "DIS_Info" command, and the payload can contain a portion of the identification information. For example depending on the packet length supported by the protocol, a DIS_Info command packet can include all of the identification information or any portion thereof, such as a single token, some of the tokens, or a portion of a token. In some embodiments, the MCD can respond with an acknowledgement to confirm receipt of each DIS-Info command (or a negative acknowledgement to indicate packet error).

Once a DIS information command has been sent, if there is more identification information to be sent as determined at block 825, then process 700 can return to block 815 to send more identification information. If there is no more identification information to be sent, the process moves on to block 830 by sending an end DIS message. An ACK DIS message can then be received at block 835 prior to ending at block 840. The ACK DIS message can include confirmation of the received identification information and/or that the received identification information was properly parsed. While process 700 ends at block 840, the accessory can continue to communicate with the MCD, for example, by proceeding with authentication processes and/or using the lingoes specified in the identification information to communicate with the MCD. Process 700 can include other actions; for example, generating information to be sent and/or requesting information from the MCD.

Figure 8:
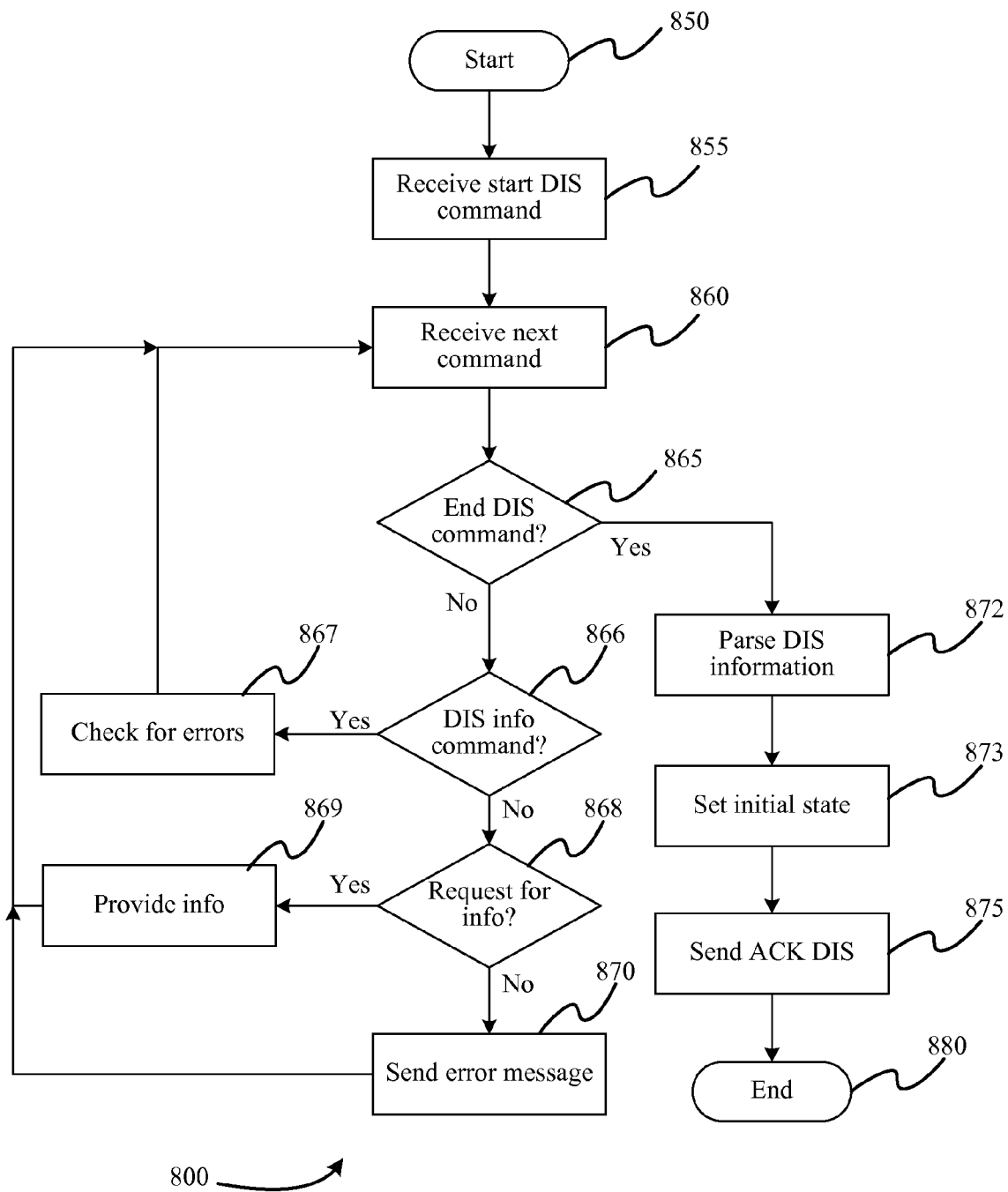
FIG. 8 shows a flowchart of an identification scheme at an MCD according to some embodiments.

FIG. 8 shows a flowchart of an identification process 800 that can be performed by an MCD according to some embodiments. Process 800 begins at block 850. A start DIS command is received from an accessory at block 855 indicating the beginning of a device identification sequence, and a next command from the accessory can be received at block 860. During the DIS sequence in some embodiments, the MCD responds only to DIS information commands and requests for information about the MCD such as lingo versions and MCD capabilities as described above. Accordingly, at block 865, the MCD can determine whether the next command is an End DIS command. If not, at block 866, the MCD can determine whether the next command is a DIS information command containing all or part of the identification information (e.g., as described above). When a DIS information command is received, the MCD can check for errors (e.g., packet transmission errors) at block 867. In some embodiments, MCD can send a message to the accessory confirming receipt of the DIS information command; in other embodiments, MCD does not send a response to a DIS information command unless an error occurs. If there are no errors, the MCD can simply store the received DIS information, e.g., in volatile or non-volatile memory. After checking for errors at block 867, processing returns to block 860 to await the next command from the accessory.

If, at block 866, the command is not a DIS information command, then at block 868, it is determined whether the next command is a request for MCD information, e.g., a request for lingo version information and/or MCD capabilities information as described above. If so, then at block 869, the MCD returns a response to the accessory with the requested information and processing returns to block 860 to await the next command from the accessory Block 870 is reached if a command other than a request for MCD information, a DIS information command or an End DIS command is received during the DIS. In some embodiments, the MCD can send an error message to the accessory at block 870 to indicate that the command is invalid; processing can return to block 860 to await the next command from the accessory.

Process 800 can continue to receive and respond to DIS-related commands until such time as an End DIS command is detected at block 865. The accessory can send any number of DIS information commands and any number of requests for information, and the commands and requests need not be sent in any particular order. DIS information can be collected and stored (e.g., in memory) until an End DIS command is received.

Once an End DIS command is detected at block 865, the MCD can parse the received DIS information at block 872. As noted above, the DIS information can be sent using one or more DIS information commands, and parsing can include processing the totality of DIS information extracted from all of the received DIS information commands. In one embodiment, the DIS information can be structured by the accessory in an arrangement similar to an XML dictionary with key-value pairs, and parsing at block 872 can leverage known techniques to separate the information into tokens (code-value pairs) and to determine the content of each token.

In some embodiments, some or all of the tokens can be fixed-length tokens and the code portion of the token can also be fixed length (e.g., one or two bytes). During parsing at block 872, the MCD can read the code portion of the token and determine the token length based on the code. In other embodiments, some or all of the tokens can be variable-length and the token can include length information in addition to the code-value pair. For example, the token can be structured such that a fixed-length code (e.g., one or two bytes) occupies the first position, followed by a length indicator (e.g., one byte). The MCD can read the code and the length indicator, then extract a token based on the length indicator.

Once the identification information has been parsed at block 872, the MCD can set its initial operating state in accordance with the DIS information at block 873. For example, the MCD can deliver the values associated with various tokens to specific processors, processing objects, modules or the like that can extract parameter settings, etc., or the MCD can write certain values directly to an appropriate control and status register that controls operation of a processor, processing object, module, logic circuit, or the like. For example, in one embodiment the Lingoes token can contain a bitmask where each bit maps to a different lingo and the state of the bit ("1" or "0") indicates whether the lingo is usable. In another embodiment, the Lingoes token can include a list of the usable lingo names. In either case, the MCD can deliver the information to a protocol manager that read the bits or list of names and enables or disables each lingo accordingly. As another example, a preferences token can include a bitmask that identifies whether specific capabilities and/or preferences should initially be enabled or not; for instance, bits can be assigned to audio line-in, audio line-out, video in, video out, and so on. The MCD can deliver this bitmask, e.g., to an audio and/or video processor that controls signal routing.

The MCD can also prepare and send an ACK DIS message to the accessory at block 875. The ACK DIS message can include confirmation of the received identification information and/or that the received identification information was properly parsed. If the information did not parse properly, the ACK DIS message can indicate the error condition. Process 800 can end at block 880, and the MCD and accessory can thereafter communicate and interoperate on the basis of the information supplied. For example, the MCD can limit the accessory to using only lingoes that were identified in the identification information.

It will be appreciated that the identification processes described herein are illustrative and that variations and modifications are possible. Steps described as sequential may be executed in parallel, order of steps may be varied, and steps may be modified, combined, added or omitted. Any amount of accessory-identification information may be sent, and the amount of such information is not constrained. The accessory can send information in any order and in some embodiments is not required to send all types of information that may be supported by the identification protocol. In some embodiments, rather than using repeated instances of a DIS information command to send all identification information, a number of different commands can be defined and associated with different types of identification information. Further, in some embodiments, the MCD can parse identification information as it is received rather than waiting for the accessory to signal the end of the identification sequence. In some embodiments, after the accessory signals the end of the identification sequence, the MCD can reject any attempt by the accessory to reidentify or to add to or alter any of the previously provided identification information until such time as the accessory disconnects and reconnects. Thus, the identification sequence can define communication parameters associated with a session between an MCD and an accessory.

In some embodiments, transaction IDs can be utilized to facilitate matching messages, commands, requests, and/or tokens with received responses, acknowledgements, data, etc. In some embodiments, the transaction ID can comprise a two byte field that is added to packets being sent to and from the accessory. The transaction ID can be included in the header, payload, or tail of a packet. When an accessory communicates on multiple ports, an independent transaction ID counter can be used on each port. Every new or retried command at each port can receive an incremented transaction ID. If a response is spread over multiple packets, then each packet can include the same transaction ID. Moreover, requests from the MCD to the accessory can include a transaction ID generated by the MCD and an accessory can respond by sending a response with the same transaction ID.

For example, a message can be sent from the accessory to the MCD requesting lingo version information with a first transaction ID. The response can then include the first transaction ID indicating that the response is tied to the message requesting lingo versions. If, for some reason, the response is not received at the accessory, the accessory can resend the lingo version request. In doing so, the accessory can include a second transaction ID. When the MCD responds to the resent request, it can include the second transaction ID. If, for some reason, the MCD responds to the first request after the second request has been sent, the first response can be ignored because it does not include the proper transaction ID.

Figure 9:
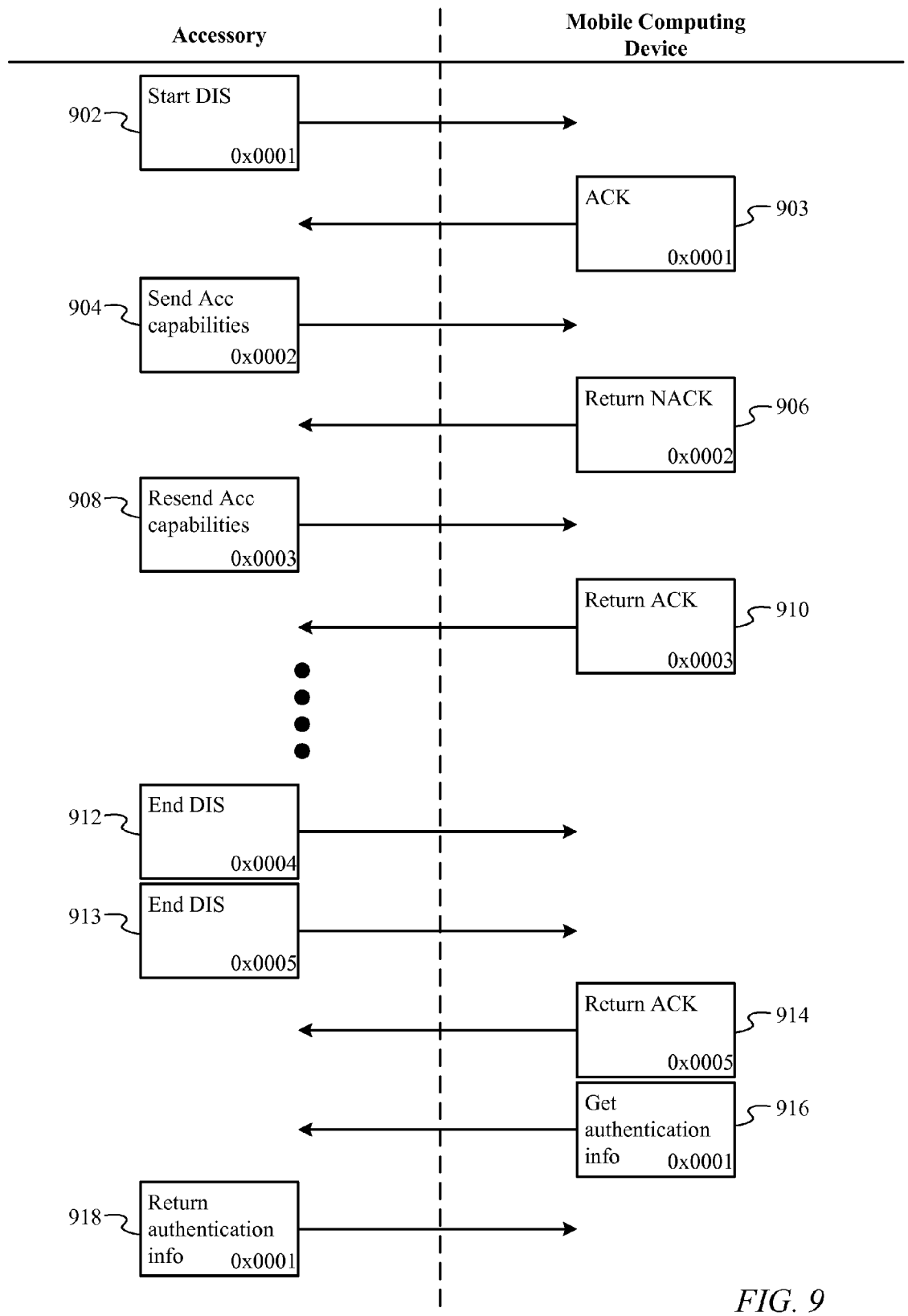
FIG. 9 shows a chart of messages being passed between an accessory and a mobile communication device using transaction identifiers according to some embodiments.

Moreover, acknowledgments can include a transaction ID to indicate what message the MCD is acknowledging. FIG. 9 shows an example of commands being passed between an accessory and an MCD using transaction IDs according to some embodiments. Any number and/or types of commands, messages, packets, etc. can be sent and/or received with transaction IDs as described above.

In FIG. 9 a Start DIS message 902 is sent from the accessory to the MCD with transaction ID 0x0001. In response, an acknowledgement 903 is returned with the same transaction ID indicating that the acknowledgement is sent in response to Start DIS message 902. Accessory capabilities message 904 can be sent to the MCD from the accessory with transaction ID 0x0002. In this example a negative acknowledgement 906 is sent indicating missing data, byte errors, with the same transaction ID 0x0002. Accordingly, the accessory resends an accessory capabilities message 908 to the MCD with a new transaction ID 0x0003. An acknowledgment 910 is returned by the MCD with the same transaction ID 0x0003. Following acknowledgement 910, the MCD and/or accessory can exchange other messages and/or commands not shown in the figure.

An End DIS message 912 is sent to the MCD with transaction ID 0x0004. However, for whatever reason, the MCD does not acknowledge receipt of the End DIS message. The accessory can then resend the End DIS message 913 with transaction ID 0x0005. A return acknowledgement 914, for example, with status information, can be sent from the MCD and received at the accessory with transaction ID 0x0005. The accessory and MCD can continue with the DIS procedure following block 914 using transaction IDs as indicated.

At some later point, get authentication information message 916 can be sent from the MCD to the accessory with a new transaction ID 0x0001, because it is being sent from the MCD to the accessory. A return authentication information message 918 can be sent from the accessory to the MCD with the same transaction ID 0x0001. The messages described in conjunction with FIG. 9 can be sent as tokens. For example the tokens can include the values described in the table shown in FIG. 5.

While the invention has been described with respect to specific embodiments, those skilled in the art will recognize that numerous variations, modifications and/or combinations are possible. Tokens can be sent in any order, as long as the association of a token's code and value is maintained. In some embodiments, a token can be split between multiple packets. In some embodiments, a token code can be sent in a first packet along with a first portion of the token value within the payload of a packet. A second packet can include the remainder of the token value in the payload of the packet. In some embodiments, the payload of the second packet can also include the token code followed by the token value. In some embodiments, the token code is not included within the payload of the packet or packets following the first packet. In some embodiments, the token value can be segmented and sent with more than two packets. In some embodiments, a token value can be sent within a single packet. The packet header, in some embodiments, can identify the length of the packet such that the length of the payload includes the length of the token code and the token value. Moreover, the tokens shown in FIG. 5 can be sent in any order. In some embodiments, one token can be sent. In some embodiments, only two of the tokens shown in FIG. 5 can be sent.

Circuits, logic modules, processors, and/or other components can be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features can be encoded on various computer-readable storage media; suitable media include magnetic disk or tape, optical storage media, such as compact disk (CD) or digital versatile disk (DVD), flash memory, and the like. Computer-readable storage media encoded with the program code can be packaged with a compatible device or provided separately from other devices. In addition program code can be encoded and transmitted via wired optical, and/or wireless networks conforming to a variety of protocols, including the Internet, thereby allowing distribution, e.g., via Internet download.

While various specific embodiments have been described herein, it will be appreciated that all modifications, equivalents, and/or combinations are within the scope of the following claims.

What is claimed is:

1. A method of operating an accessory, the method comprising:
   establishing communication with a mobile computing device;
   sending an identify token to the mobile computing device, wherein the identify token includes information identifying one or more lingoes as being usable by the accessory;
   sending a capability token to the mobile computing device, the capability token including information specifying one or more capabilities of the mobile computing device as being supported by the accessory, wherein the capability token includes a code-value pair, the code being indicative of (a) a type of information included in the capability token and (b) a length of the capability token, and the value representing the actual information; and
   subsequently communicating with the mobile computing device, wherein only the identified one or more lingoes and only the specified one or more capabilities are usable by the accessory while communicating with the mobile computing device.

2. The method according to claim 1, wherein the identify token includes a bitmask where each bit is associated with a lingo and the state of the bit identifies whether the lingo is usable by the accessory.

3. The method according to claim 1, wherein the capability token includes a bitmask where each bit is associated with a capability and the state of the bit identifies whether the capability is supported by the accessory.

4. The method according to claim 1, where the one or more capabilities of the mobile computing device includes at least one of analog line-in to the mobile computing device, analog line-out from the mobile computing device, analog video-in to the mobile computing device, analog video-out from the mobile computing device, digital audio out from the mobile computing device, digital audio in to the mobile computing device, digital video in to the mobile computing device, digital video out, speakerphone, or communication with mobile computing device operating system application.

5. The method according to claim 1, wherein the accessory establishes wireless communications with the mobile computing device.

6. The method according to claim 1, further comprising sending an accessory information token to the mobile computing device, wherein the accessory information token includes information indicating at least one of accessory name, accessory firmware version, accessory hardware version, accessory manufacturer, accessory model number, and accessory serial number.

7. The method according to claim 1, further comprising sending a preference token indicating a preferred. state of at least one of the capabilities indicated in the capabilities token.

8. The method according to claim 1, further comprising sending a preference token indicating the "ON" state of at least one of analog line-in to the mobile computing device, analog line-out from the mobile computing device, analog video-in to the mobile computing device, analog video-out from the mobile computing device, digital audio out from the mobile computing device, digital audio in to the mobile computing device, digital video in to the mobile computing device, digital video out, speakerphone, or communication with the mobile computing device operating system.

9. A method comprising:
establishing, by an accessory device, communication with a mobile computing device;
requesting, by the accessory device lingo version information from the mobile computing device;
receiving lingo version information from the mobile computing device, wherein the lingo version information identifies one or more lingo versions supported by the mobile computing device;
requesting capability information from the mobile computing device;
receiving a plurality of tokens from the mobile computing device, wherein each token from the plurality of tokens includes a code indicating type of information included in the token, followed by a length indicator indicating length of the token, followed by a value representing actual information;
extracting a capability token, from the plurality of tokens based on the code and the length indicator, wherein the capability information identifies one or more capabilities of the mobile computing device, wherein the capability token includes the capability information of the mobile computing device; and
sending information indicating one or more lingoes usable by the accessory, wherein the one or more lingoes depend at least in part on at least one of the received lingo version information and the received capabilities information.

10. The method according to claim 9, further comprising:
subsequent to sending the information, restricting lingoes used by the accessory to those indicated as being usable by the accessory.

11. The method according to claim 9, further comprising sending accessory capability information to the mobile computing device, wherein the accessory capability information specifies capabilities supported by the accessory.

12. The method according to claim 9, further comprising sending the preferred state for at least one of the capabilities supported by the accessory.

13. The method according to claim 9, further comprising sending accessory information to the mobile computing device, wherein the accessory information indicates accessory related information including at least one of accessory name, accessory firmware version, accessory hardware version, accessory manufacturer, accessory mode number, and accessory serial number.

14. The method according to claim 9, further comprising sending accessory protocol information, wherein the accessory protocol information includes an indication of at least one of an accessory protocol name and an accessory protocol identifier.

15. The method according to claim 14, further comprising sending information indicating a preferred application for execution on the mobile computing device in conjunction with an accessory protocol indicated in the accessory protocol information.

16. An accessory device comprising:
a processor;
a memory coupled to the processor;
a communication interface coupled to the processor and to communicably couple with a mobile computing device; and
control logic coupled with the communication interface, the control logic to send messages to and receive messages from the mobile computing device via the communication interface, wherein the control logic sends an accessory capability token to the mobile computing device using the communication interface, the accessory capability token including information specifying one or more capabilities of the mobile computing device as being supported by the accessory, the accessory capability token comprising (a) a code indicative of type of information included in the accessory capability token and a length of the accessory capability token and (b) a bitmask that indicates the capabilities supported by the accessory,
wherein only the specified one or more capabilities are usable by the accessory while communicating with the mobile computing device.

17. The accessory device according to claim 16, wherein the communication interface includes a wireless interface.

18. The accessory device according to claim 16, wherein the control logic further sends a usable lingo message to the mobile computing device using the communication interface comprising a bitmask that indicates the lingoes usable by the accessory.

19. The accessory device according to claim 16, wherein the control logic further sends a preferences message to the mobile computing device using the communication interface comprising a bitmask that indicates the initial state of at least one of the capabilities indicated in the capabilities message.

20. An accessory device comprising:
a processor;
a memory coupled to the processor;
a communication interface coupled to the processor to communicably couple with a mobile computing device; and
control logic coupled with the communication interface, the control logic to send messages to and receive messages from the mobile computing device via the interface, wherein the control logic sends a usable lingo token to the mobile computing device using the communication interface, the usable lingo token including information identifying one or more lingoes as being usable by the accessory, the usable lingo token comprising (a) a code indicative of type of information included in the usable lingo token, (b) a length indicator indicating length of the usable lingo token, and (c) a bitmask that indicates the lingoes usable by the accessory, wherein only the identified one or more lingoes are usable by the accessory while communicating with the mobile computing device.

21. An accessory device for use with a portable computing device, the accessory comprising:
- a processor;
- a memory coupled to the processor;
- an interface coupled to the processor to communicably couple the accessory with a portable computing device; and
- control logic coupled with the interface, the control logic in conjunction with the processor to send messages to and receive messages from the portable computing device via the interface, wherein a message comprises a plurality of tokens and wherein each of the plurality of tokens comprises a code indicative of the type of information included in the token and the length of the token and a value indicative of the actual information;
- wherein the control logic:
  - sends a first message to the portable computing device requesting lingo version information;
  - sends a second message to the portable computing device requesting a response from the portable computing device that includes an indication of capabilities of the portable computing device;
  - receives a third message from the portable computing device including a first token and a second token, wherein the first token corresponds to the lingo version information and includes a first code indicative of (i) type of information included in the first token and (ii) length of the first token and the lingo version information, and wherein the second token corresponds to the capabilities information of the portable computing device and includes a second code indicative of (iii) type of information included in the second token and (iv) length of the second token and capabilities information of the portable computing device;
  - extracts the first token from the third message based on the first code and the second token based on the second code; and
  - sends a third token to the portable computing device, the third token comprising (a) a third code indicative of type of information included in the third token and (b) information indicating lingoes usable by the accessory.

22. The accessory device according to claim 21, wherein the lingoes usable by the accessory depend at least in part on one or both of the capabilities of the portable computing device and the one or more lingo versions supported by the portable computing device.

23. The accessory device according to claim 21, wherein the control logic further sends a fourth message including an indication of accessory information, wherein the accessory information includes an indication of at least one of accessory name, accessory firmware version, accessory hardware version, accessory manufacturer, accessory model number, and accessory serial number.

24. The accessory device according to claim 21, wherein the control logic further sends a fourth token including (a) a fourth code indicative of a type of information included in the fourth token and (b) an indication of one or more supported communication protocols.

25. The accessory device according to claim 21, wherein the control logic further sends a fourth message indicating one or more capabilities of the accessory, wherein the one or more capabilities include analog line-in to the mobile computing device, analog line-out from the mobile computing device, analog video-in to the mobile computing device, analog video-out from the mobile computing device, digital audio out from the mobile computing device, digital audio in to the mobile computing device, digital video in to the mobile computing device, digital video out, speakerphone, or communication with the mobile computing device operating system.

26. The accessory device according to claim 25, wherein the control logic further sends a fifth message including an indication of the preferences for the capabilities indicated in the fourth message.

27. The accessory device according to claim 21, wherein the one or more capabilities of the portable computing device includes at least one of analog line-in to the mobile computing device, analog line-out from the mobile computing device, analog video-in to the mobile computing device, analog video-out from the mobile computing device, digital audio out from the mobile computing device, digital audio in to the mobile computing device, digital video in to the mobile computing device, digital video out, speakerphone, or communication with the mobile computing device operating system.

* * * * *